United States Patent [19]
Kepler

[11] 3,942,234
[45] Mar. 9, 1976

[54] SEAL AND BEARING INSTALLATION TOOL

[76] Inventor: Larry A. Kepler, 1755 Granville AVe. No. 5, West Los Angeles, Calif. 90025

[22] Filed: July 8, 1974

[21] Appl. No.: 486,371

[52] U.S. Cl. ................... 29/201 R; 29/275; 81/8.1; 308/187.1
[51] Int. Cl.² ........................................ B23P 19/04
[58] Field of Search ............ 29/201, 255, 275, 282; 81/8.1; 308/187.1

[56] References Cited
UNITED STATES PATENTS

| | | | |
|---|---|---|---|
| 2,852,838 | 9/1958 | Krutmeijer | 29/275 |
| 3,083,449 | 4/1963 | Simmons | 29/282 |
| 3,165,949 | 1/1965 | Thill | 81/8.1 |
| 3,266,347 | 8/1966 | Robertson | 29/275 |
| 3,500,527 | 3/1970 | Sutowski | 29/201 |

*Primary Examiner*—M. H. Wood, Jr.
*Assistant Examiner*—Richard A. Bertsch
*Attorney, Agent, or Firm*—Jack C. Munro

[57] ABSTRACT

A seal and bearing installation tool kit which is composed of a plurality of different tools for installing different sizes of seals and bearings. Each tool of this invention is composed of a tubular member which has a hollow chamber and open at both ends. Within one of the ends is frictionally supported a force distribution member. Within the other end is frictionally supported a cap member. The cap member is adapted to be hammered with a hammer with the applying force being transmitted through the tubular member to the force distribution member and to the seal or bearing which is to be seated within a fixed housing.

4 Claims, 6 Drawing Figures

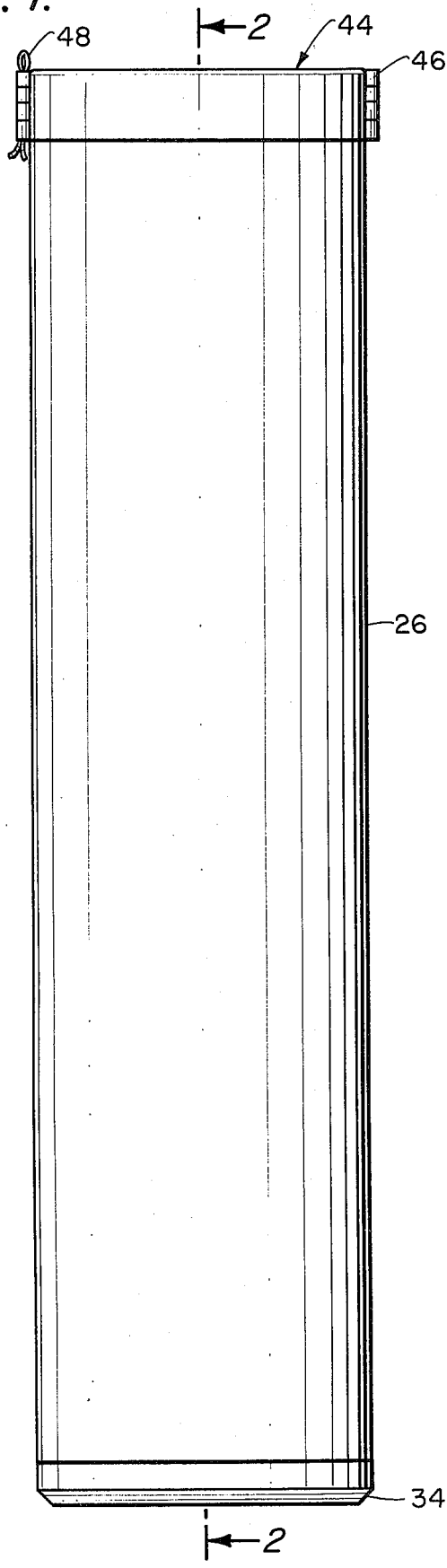
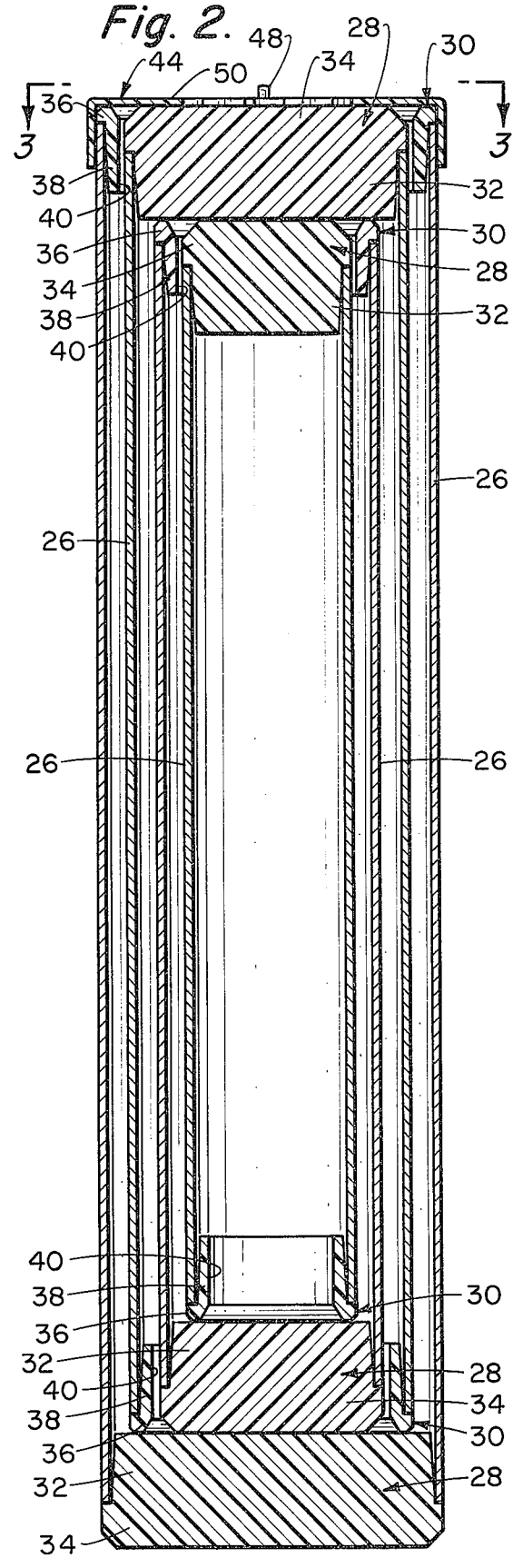

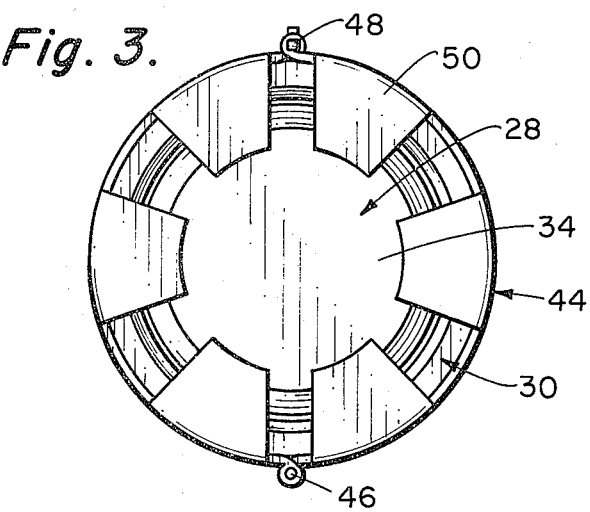
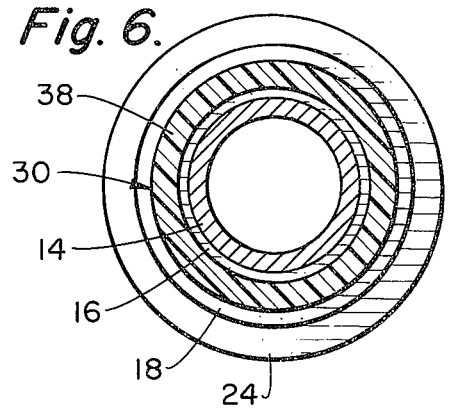
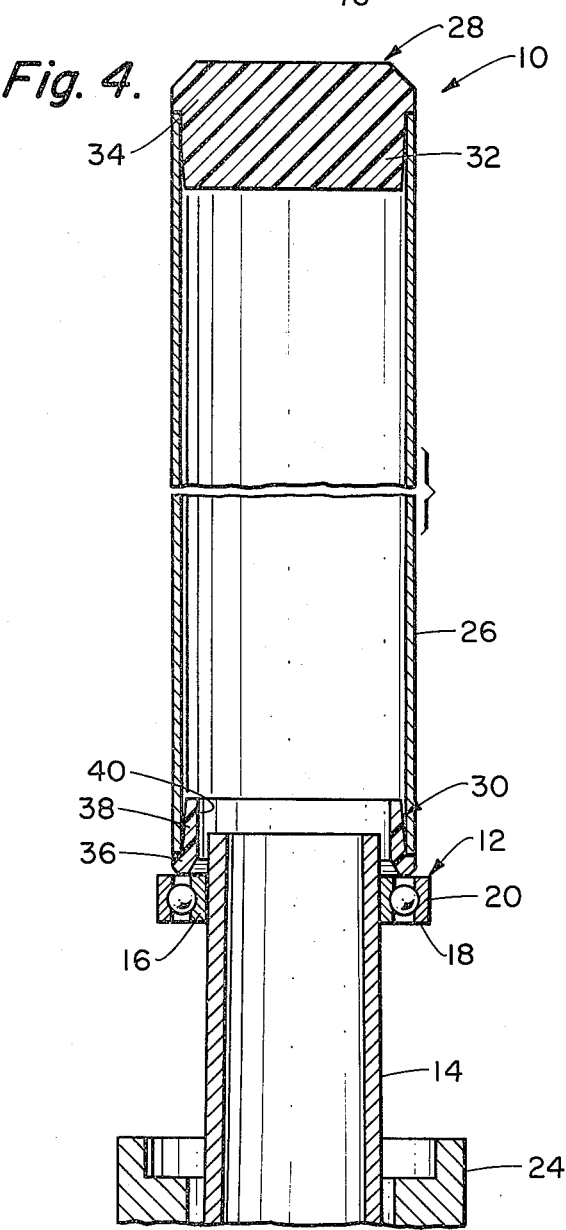
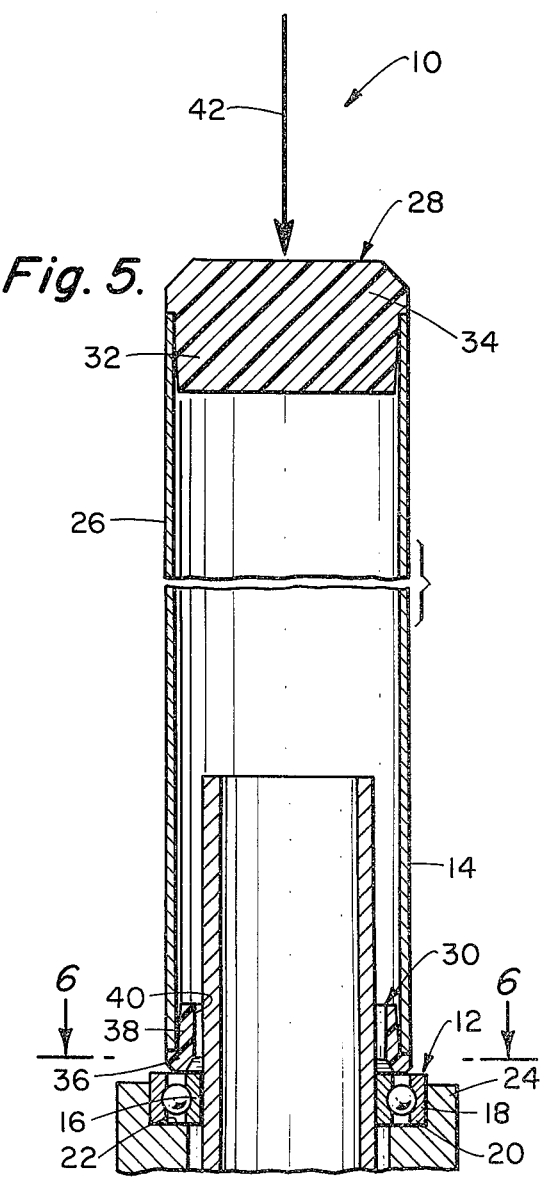

SEAL AND BEARING INSTALLATION TOOL

BACKGROUND OF THE INVENTION

Between a rotating member (such as a shaft) and a fixed member (a housing of some type) there must be placed a bearing assembly such as a roller bearing. Within the fixed member is formed a seat within which the roller bearing is to be snugly retained. The inner race of the roller bearing is to support the rotatable shaft with the outer race being press fitted against the fixed housing.

The normal method of inserting the roller bearing within the seat is to position the roller bearing partially within the seat and then, to apply a force as with a hammer and a tool (such as a screwdriver) to securely seat the roller bearing by repeatedly moving the screwdriver around the outer race of the roller bearing as the hammer strikes the base of the screwdriver. The end result is usually a not perfect seating of the roller bearing and also the seating procedure is rather time consuming.

It would be more desirable to apply the force to the outer race of the roller bearing in an even manner and also longitudinally with respect to the shaft. The end result would be a perfect seating for the roller bearing and in no way could it be misaligned.

However, the conventional seal and bearing installation tools are not capable of seating roller bearings because the shaft would physically interfere with the tool accomplishing the installation. Previously, there has been no known tool which is to accomplish the correct seating of a shaft supporting roller bearing within a seat formed in a fixed housing. The foregoing discussion, although directed to roller bearings, is also applicable to seals when the seal is employed to seal a shaft with respect to a fluid chamber.

SUMMARY OF THE INVENTION

This invention is believed to be adequately described in the Abstract Of The Disclosure and reference is to be had thereto.

The primary objective of the structure of this invention is to design a seal and bearing installation tool kit which is capable of positioning, in a precise manner, a seal or bearing about a shaft within a seat formed in a fixed housing. This installation is accomplished without fear of damaging the seal or bearing and is accomplished quickly and easily. The tools of the kit of this invention are formed of durable material and under normal use are expected to last for several years. The different tools of this invention may be designed in such a manner that they are to nest together thereby minimizing the storage space when not in use. The different elements of each tool are constructed so that if per chance one becomes broken or damaged it can be replaced without requiring replacement of the other parts.

BRIEF DESCRIPTION OF THE DRAWINGS

FIG. 1 is a longitudinal side view of a nested assembly of the tools of this invention;

FIG. 2 is a cross-sectional view taken along line 2—2 of FIG. 1;

FIG. 3 is a top view of the nested tools of this invention taken along line 3—3 of FIG. 2;

FIG. 4 is cross-sectional view through a single tool of this invention showing how the tool is being used to move a roller bearing along the shaft toward a seat formed in a fixed housing;

FIG. 5 is a view similar to FIG. 4 but showing the tool moved further along the shaft; and FIG. 6 is a cross-sectional view taken along line 6—6 of FIG. 5.

DETAILED DESCRIPTION OF THE SHOWN EMBODIMENT

Referring particularly to the drawings and in particular to FIGS. 4 to 6, a tool 10 of this invention is shown being used to mount a roller bearing 12 upon a shaft 14. The roller bearing 12 is conventional and includes an inner race 16 and an outer race 18 which support a plurality of ball bearings 20 therebetween. The inner race 16 is to establish a very tight frictional fit with the shaft 14. The roller bearing 12 is to be positioned within seat 22 formed within fixed housing 24. The tool 10 of this invention is designed to correctly position within the seat 22 the roller bearing 12.

The tool 10 of this invention includes a tubular metallic, such as steel, housing 26. The housing 26 is cylindrical in configuration but it is envisioned to be within the scope of this invention that it may be other than cylindrical, such as octagonal, hexagonal or other tubular polygonal construction. Normally, the outer surface of the tubular housing 26 will have a polished chrome surface. The tubular housing 26 is open at each end.

Within one end of the housing 26 is mounted a cap 28. Within the other end of the tubular housing 26 is mounted a force distribution member 30. Both the cap 28 and the force distribution member 30 are to be formed of a non-metallic material, such as butyrate plastic. Such plastic is quite strong, inexpensive and it is shock resistant. The reason such plastic is used is that the plastic material is sufficiently resilient, however very rigid to deter the damage effect of the manner used to apply the force. A steel against steel situation would be undesirable as a steel cap and a steel force distribution member would tend to become dented and otherwise damaged over a period of time.

The cap 28 includes a smaller diametered plug 32. The plug 32 is formed integrally with the cap 28. The outer diametered surface of the plug 32 is tapered so that the end of the plug is of a less diameter than the portion of the plug adjacent the enlarged section 34 of the cap 28. The inner edge of the enlarged section 34 is in abutting contact with the end of the housing 26. Because of the taper created on the plug 32, an extremely tight frictional interfit is established between the tubular housing 26 and the cap 28.

The force distribution member 30 includes an annular flange 36 to which is integrally connected a sleeve 38. The sleeve 38 includes a central enlarged opening 40 therethrough. The periphery of the sleeve 38 is tapered in the manner similar to the tapering of the plug 32 and the taper functions to facilitate a tight frictional fit between the sleeve 38 and the tubular housing 26. The inner surface of the flange 36 is to be in abutting contact with the edge of the other end of the tubular housing 26. The forward surface of the flange 36 is to be in contact with the seal or bearing 12 and functions to evenly distribute the forces about the periphery of the roller bearing 12.

In actual operation, a force represented by arrow 42 is to be applied by means of some instrument, such as a hammer, to the cap 28. This force is transferred through the tubular housing 26 to the force distribution member 30. The force is thereupon transmitted to the roller bearing or seal 12 which has been positioned upon the shaft 14. This force, then in turn, evenly moves the roller bearing or seal along the shaft 14 until it is snugly positioned within the seat 22 formed within the fixed housing 26. The shaft 14 moves through opening 40 and within the interior of the tubular housing 26. Once the roller bearing 12 or seal is positioned within the seat 22, the tool 10 is removed and its use no longer required for this particular roller bearing 12.

There are many different sizes of bearings and seals and also the structure of this convention could be used to install bushings, gears, pump impellers, oil seals, dust seals, sprockets, pulleys, casting plugs, couplings, plus many other items. Therefore, more than one diameter of tubular housing 26 will be employed. In actual practice, it is envisioned that the tubular housing 26 will be constructed in a 1 and ¼ inch diameter, a 1 and ¾ inch diameter, a 2 and a ¼ inch diameter, and a 2 and ¾ inch diameter. The 1 and ¼ inch diameter housing is adapted to fit over a 1 inch shaft with the 1 and ¾ inch diameter to fit over a 1 and ½ inch shaft, the 2 and a ¼ inch diameter to fit over a 2 inch shaft and the 2 and ¾ inch diameter to fit over a 2 and a ½ inch diameter shaft. These four sizes of tubular housings are shown in FIGS. 1 to 3.

In order to facilitate storage of these four different sizes, it may be desirable to place one tubular housing inside of the other starting with the smallest tubular housing and proceeding to the largest tubular housing. In such an arrangement, the smallest tubular housing is inverted and placed within the next sized tubular housing so that there is, in essence, a cap 28 located at each end. This procedure is reversed for the next size of tubular housing and again for the larger sized tubular housing. It is to be noted that the length of each of the tubular housings in this instance are selected so as to facilitate this nesting arrangement. In other words, the largest diametered tubular housing is the longest with the smallest diametered tubular housing being the shortest. When all of the tubular tools 10 are stored in this nested arrangement, it will be desirable to clamp the cap 28 of the largest size to the largest sized tubular housing 26 in order to prevent accidental separation of the tools 10. In order to accomplish this, a split ring band 44 may be employed which includes a hinge joint 46 and a cotter key connecting joint 48. The band 44 also includes a plurality of radial extending fingers 50 in order to prevent disassociation of the tools 10 placed within the largest size of tubular housing 26.

What is claimed is:

1. An installation tool for installing devices such as seals and bearings within a seat, said tool comprising:
    a tubular member having a hollow chamber open at both ends;
    a cap located within one of said ends, said cap including a plug which closely interfits in a telescoping manner within said tubular member, said cap to be struck by a hammer with said cap distributing the application force of the hammer to said tubular member;
    a force distribution member connected to the other of said ends, said force distribution member including a sleeve integrally attached to said flange, said sleeve telescopingly cooperating in a tight fitting manner within said tubular member, the inner surface of said flange to abut the edge of said tubular member, the outer surface of said flange to contact the annular housing of a said device to evenly distribute the application force annularly about the device and cause such to be seated correctly within its said seat;
    said sleeve establishing a frictional tight fit with said tubular member, said plug forming a frictional tight fit with said tubular member;
    said sleeve being tapered with the taper being largest adjacent said flange, whereby as said sleeve is inserted into said tubular member the frictional fit in between said tubular member and said sleeve increases in tightness due to said taper.

2. The tool as defined in claim 1 wherein:
    said plug being tapered so as to provide for a tighter interfit between said tubular member and said plug as said plug is inserted within said tubular member.

3. The tool as defined in claim 2 wherein:
    both said force distribution member and said cap being formed of a rigid non-metallic synthetic material.

4. The tool as defined in claim 3 wherein:
    therebeing a plurality of different sizes of said tools, said tools being capable of nesting together to form a compact tool unit.

* * * * *